United States Patent
Shkedi

(10) Patent No.: US 8,244,574 B2
(45) Date of Patent: *Aug. 14, 2012

(54) METHOD, COMPUTER SYSTEM, AND STORED PROGRAM FOR CAUSING DELIVERY OF ELECTRONIC ADVERTISEMENTS BASED ON PROVIDED PROFILES

(75) Inventor: Roy Shkedi, New York, NY (US)

(73) Assignee: Datonics, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,110

(22) Filed: Jun. 27, 2011

(65) Prior Publication Data

US 2011/0258051 A1    Oct. 20, 2011

Related U.S. Application Data

(63) Continuation of application No. 11/765,433, filed on Jun. 19, 2007.

(60) Provisional application No. 60/805,114, filed on Jun. 19, 2006.

(51) Int. Cl.
*G06Q 30/00* (2006.01)

(52) U.S. Cl. .................................. 705/7.33; 705/14.53

(58) Field of Classification Search .................. 705/7.33, 705/14.53
See application file for complete search history.

(56) References Cited

U.S. PATENT DOCUMENTS

| | | |
|---|---|---|
| 5,710,884 A | 1/1998 | Dedrick |
| 5,717,923 A | 2/1998 | Dedrick |
| 5,724,521 A | 3/1998 | Dedrick |
| 5,752,238 A | 5/1998 | Dedrick |
| 5,794,210 A | 8/1998 | Goldhaber et al. |
| 5,855,008 A | 12/1998 | Goldhaber et al. |
| 5,918,014 A | 6/1999 | Robinson |
| 5,948,061 A | 9/1999 | Merriman et al. |
| 6,026,368 A | 2/2000 | Brown et al. |
| 6,044,376 A | 3/2000 | Kurtzman, II |
| 6,055,513 A | 4/2000 | Katz et al. |
| 6,073,241 A | 6/2000 | Rosenberg et al. |

(Continued)

FOREIGN PATENT DOCUMENTS

KR    2001-0096343    11/2001

(Continued)

OTHER PUBLICATIONS

Kerwin; "NY Times Web Site Lets Advertiers Get Personal: Profile Info From Users Allows Ads to be Highly Targeted;" Advertising Age; Jul. 14, 1997.

(Continued)

*Primary Examiner* — Donald L. Champagne
(74) *Attorney, Agent, or Firm* — Louis J. Hoffman; David S. Alavi

(57) ABSTRACT

To improve monetization of electronic advertisement placement, a profile owner company operates an automatic system for identifying media properties that have interests in specific profiles or profiles of a specified category or kind. The profile owner recognizes a collected visitor profile as one that a media property has previously requested or one that is within a category that a media property has previously requested and arranges for the visitor to be tagged with a tag readable by the media property that requested such a profile. The media property can use the tag in displaying customized advertising to the visitor. Using information received from the media property, the profile owner company then records usage of the profile by the media property.

24 Claims, 2 Drawing Sheets

U.S. PATENT DOCUMENTS

| | | | |
|---|---|---|---|
| 6,141,010 A | 10/2000 | Hoyle |
| 6,216,129 B1 | 4/2001 | Eldering |
| 6,285,987 B1 | 9/2001 | Roth |
| 6,324,519 B1 | 11/2001 | Eldering |
| 6,366,298 B1 | 4/2002 | Haitsuka et al. |
| 6,385,592 B1 | 5/2002 | Angles et al. |
| 6,446,261 B1 | 9/2002 | Rosser |
| 6,484,492 B2 | 11/2002 | Meholic et al. |
| 6,487,538 B1 | 11/2002 | Gupta et al. |
| 6,615,247 B1 | 9/2003 | Murphy |
| 683,220 A1 | 12/2004 | Shkedi |
| 6,832,207 B1 | 12/2004 | Shkedi |
| 6,868,392 B1 | 3/2005 | Ogasawara |
| 692,544 A1 | 8/2005 | Shkedi |
| 6,925,440 B1 | 8/2005 | Shkedi |
| 697,343 A1 | 12/2005 | Shkedi |
| 6,973,436 B1 | 12/2005 | Shkedi |
| 6,983,379 B1 | 1/2006 | Spalink et al. |
| 7,013,290 B2 | 3/2006 | Ananian |
| 704,353 A1 | 5/2006 | Seibel et al. |
| 7,039,594 B1 | 5/2006 | Gersting |
| 7,051,351 B2 | 5/2006 | Goldman et al. |
| 7,058,593 B1 | 6/2006 | Merritt |
| 7,065,550 B2 | 6/2006 | Raghunandan |
| 707,285 A1 | 7/2006 | Shkedi |
| 7,072,853 B2 | 7/2006 | Shkedi |
| 7,155,508 B2 | 12/2006 | Sankuratripati et al. |
| 7,181,438 B1 | 2/2007 | Szabo |
| 718,807 A1 | 3/2007 | Bensemana |
| 7,194,424 B2 | 3/2007 | Greer et al. |
| 7,343,354 B2 | 3/2008 | Hennessey |
| 7,346,615 B2 | 3/2008 | Bem |
| 7,360,251 B2 | 4/2008 | Spalink et al. |
| 7,373,599 B2 | 5/2008 | McElfresh et al. |
| 7,428,493 B2 | 9/2008 | Shkedi |
| 7,454,364 B2 | 11/2008 | Shkedi |
| 7,546,249 B2 | 6/2009 | Main |
| 7,558,795 B2 | 7/2009 | Malik et al. |
| 7,698,422 B2 | 4/2010 | Vanderhook et al. |
| 7,725,944 B2 | 5/2010 | Spalink et al. |
| 7,747,745 B2 | 6/2010 | Shkedi |
| 7,756,744 B2 | 7/2010 | Schiff et al. |
| 7,822,637 B2 | 10/2010 | Shkedi |
| 7,822,639 B2 | 10/2010 | Shkedi |
| 7,861,260 B2 | 12/2010 | Shkedi |
| 7,890,609 B2 | 2/2011 | Shkedi |
| 7,937,383 B2 | 5/2011 | Hintze et al. |
| 7,979,307 B2 | 7/2011 | Shkedi |
| 8,036,929 B1 | 10/2011 | Reisman |
| 8,051,444 B2 | 11/2011 | Shkedi |
| 8,086,491 B1 | 12/2011 | Matz et al. |
| 2001/0020242 A1 | 9/2001 | Gupta et al. |
| 2001/0039515 A1 | 11/2001 | Mayadas |
| 2001/0044743 A1 | 11/2001 | McKinley et al. |
| 2002/0002541 A1 | 1/2002 | Williams |
| 2002/0029267 A1 | 3/2002 | Sankuratripati |
| 2002/0072965 A1 | 6/2002 | Merriman et al. |
| 2002/0072971 A1 | 6/2002 | DeBusk et al. |
| 2002/0082910 A1 | 6/2002 | Kontogouris |
| 2002/0082923 A1 | 6/2002 | Merriman et al. |
| 2002/0091568 A1 | 7/2002 | Kraft et al. |
| 2002/0099603 A1 | 7/2002 | Bandura |
| 2002/0112013 A1 | 8/2002 | Walsh |
| 2002/0123928 A1 | 9/2002 | Eldering et al. |
| 2002/0143632 A1 | 10/2002 | Walter et al. |
| 2002/0161636 A1 | 10/2002 | Takahashi |
| 2002/0194058 A1 | 12/2002 | Eldering |
| 2003/0036944 A1 | 2/2003 | Lesandrini et al. |
| 2003/0046156 A1 | 3/2003 | Cromer et al. |
| 2003/0065558 A1 | 4/2003 | Shaw et al. |
| 2003/0083938 A1 | 5/2003 | Smith et al. |
| 2003/0110497 A1 | 6/2003 | Yassin et al. |
| 2003/0135413 A1 | 7/2003 | Nishi et al. |
| 2003/0154126 A1 | 8/2003 | Gehlot et al. |
| 2003/0171990 A1 | 9/2003 | Rao et al. |
| 2003/0220837 A1 | 11/2003 | Asayama |
| 2004/0024632 A1 | 2/2004 | Perry |
| 2004/0059632 A1 | 3/2004 | Kang et al. |
| 2004/0068436 A1 | 4/2004 | Boubek |
| 2004/0117322 A1 | 6/2004 | Bjorksten et al. |
| 2004/0260605 A1 | 12/2004 | McIntyre et al. |
| 2005/0010472 A1 | 1/2005 | Quatse et al. |
| 2005/0021397 A1 | 1/2005 | Cui et al. |
| 2005/0028188 A1 | 2/2005 | Latona et al. |
| 2005/0038698 A1 | 2/2005 | Lukose et al. |
| 2005/0038702 A1 | 2/2005 | Merriman et al. |
| 2005/0086112 A1 | 4/2005 | Shkedi |
| 2005/0086113 A1 | 4/2005 | Shkedi |
| 2005/0120091 A1 | 6/2005 | Casais |
| 2005/0131762 A1 | 6/2005 | Bharat et al. |
| 2005/0165644 A1 | 7/2005 | Beyda et al. |
| 2005/0216336 A1 | 9/2005 | Roberts et al. |
| 2005/0216823 A1 | 9/2005 | Petersen |
| 2005/0222905 A1 | 10/2005 | Wills |
| 2005/0278443 A1 | 12/2005 | Winner et al. |
| 2006/0020508 A1 | 1/2006 | Gorti et al. |
| 2006/0020510 A1 | 1/2006 | Vest |
| 2006/0053047 A1 | 3/2006 | Garcia et al. |
| 2006/0064351 A1 | 3/2006 | Hamor et al. |
| 2006/0069614 A1 | 3/2006 | Agarwal et al. |
| 2006/0070117 A1 | 3/2006 | Spalink et al. |
| 2006/0085263 A1 | 4/2006 | Greer et al. |
| 2006/0095322 A1 | 5/2006 | Dierks |
| 2006/0106710 A1 | 5/2006 | Meek et al. |
| 2006/0116924 A1 | 6/2006 | Angles et al. |
| 2006/0122879 A1 | 6/2006 | O'Kelley |
| 2006/0161553 A1 | 7/2006 | Woo |
| 2007/0121843 A1 | 5/2007 | Atazky et al. |
| 2007/0294401 A1 | 12/2007 | Shkedi |
| 2008/0133342 A1 | 6/2008 | Criou et al. |
| 2009/0049468 A1 | 2/2009 | Shkedi |
| 2009/0049469 A1 | 2/2009 | Small et al. |
| 2009/0129377 A1 | 5/2009 | Chamberlain et al. |
| 2009/0132559 A1 | 5/2009 | Chamberlain et al. |
| 2009/0172723 A1 | 7/2009 | Shkedi |
| 2009/0172728 A1 | 7/2009 | Shkedi |
| 2010/0198705 A1 | 8/2010 | Spalink et al. |
| 2010/0299431 A1 | 11/2010 | Vanderhook et al. |
| 2011/0035256 A1 | 2/2011 | Shkedi |
| 2011/0040620 A1 | 2/2011 | Shkedi |
| 2011/0167043 A1 | 7/2011 | Hintze et al. |

FOREIGN PATENT DOCUMENTS

| | | |
|---|---|---|
| KR | 20040026167 | 3/2004 |
| KR | 2004099222 A | 11/2004 |
| WO | WO2004084109 A1 | 9/2004 |
| WO | WO2005/046237 | 5/2005 |

OTHER PUBLICATIONS

Engage Technologies, Inc.; Form S-1A; filed with the SEC; pp. 36-50; Jul. 19, 1999.

"The e-Marketing Report"; Morgan Stanley Dean Whitter; May 2000; portions.

New York Times Reference Dictionary definition of "computer," downloaded Apr. 7, 2010.

METHOD, COMPUTER SYSTEM, AND STORED PROGRAM FOR CAUSING DELIVERY OF ELECTRONIC ADVERTISEMENTS BASED ON PROVIDED PROFILES

CROSS REFERENCE TO RELATED APPLICATIONS

This application is a continuation of application Ser. No. 11/765,433, filed Jun. 19, 2007, which claims the benefit of provisional application Ser. No. 60/805,114, filed Jun. 19, 2006, which is incorporated herein by reference.

FIELD OF THE INVENTION

The present invention generally relates to profile-based behavioral targeting advertisement placement services. More specifically, the present invention relates to improving monetization of electronic advertisement placement.

BACKGROUND OF THE INVENTION

DoubleClick's "Boomerang" is a service for advertisers that places a cookie on computers of visitors to an advertiser's site for the purpose of finding those visitors on other sites where DoubleClick is the ad server ("ad" is short for advertisement). When the same visitors are found on those other sites, additional advertiser's ads are served to them by the DoubleClick ad sever or by the advertiser's ad server following a redirect from the DoubleClick ad server.

The only server that can read a cookie on a user's computer is a server operating under the same domain as the server that placed the cookie on a user's computer to begin with. In other words, a cookie placed by a server operating under one domain cannot be read by another server working under a separate domain. That is why the advertiser cannot expect to place a cookie of its own (e.g., ford.com cookie) on a visitor to its site and then later expect the DoubleClick ad server (doubleclick.com) to be able to recognize the visitor when that visitor is visiting sites where DoubleClick serves ads by reading the ford.com cookies. Only a server operating under the DoubleClick domain can read a cookie placed by a server operating under the DoubleClick domain. So, DoubleClick needs to place a doubleclick.com cookie on visitors to the ford.com site for DoubleClick to later find those visitors within other sites, i.e., where the DoubleClick ad server is used to serve ads.

For a site to have its ad served by an ASP-hosted ad server, such as the one operated by DoubleClick, the site needs to redirect visitors from the site to the DoubleClick ad server, to fetch the ad from the server. Following the redirect from the site, the visitor accesses the DoubleClick ad server. Because the DoubleClick server is operating under the DoubleClick domain, it can read the DoubleClick cookie or cookies and then recognize that it encountered the same visitor in the past. In this example, the DoubleClick ad server recognizes the visitor as someone who visited the ford.com site.

AlmondNet, Tacoda, RevenueScience, and other companies (herein "BT companies"; "BT" stands for behavioral targeting) specialize in targeting ads based on observed behavior of sites' visitors. To record a visitor's observed behavior, a BT company places a cookie (or cookies) on the computers of visitors to specific sections of a publisher's website or on the computers of visitors of the publisher who conducted a specific action such as search, click content, click an ad, make a phone call, request information, acquire a product, etc.

The placement of cookies allows those publishers or the BT company itself to sell ads to advertisers. Those ads will be presented to the profiled visitors when they are found later on the same site or on other sites. Such sites can be either a site where the BT company's software is used or a site where the BT company has bought media. The BT company may buy the media on behalf of itself or on behalf of the publisher, who is interested in delivering ads to its audience outside the publisher's site.

Although a BT company (AlmondNet, Tacoda, RevenueScience, etc.) acts as an agent that places cookies on the computers of publisher's visitors for the purpose of delivering targeted ads to the publisher's visitors on other sites, the publisher can work without an agent and place cookies or tags on the computers of the publisher's own visitors for the purpose of delivering ads to those visitors on other sites where the publisher buys ad space. Such a publisher, acting without an agent, is also included in the definition of a BT company.

A publisher may also be referred to as a "profile supplier" when it transfers profile information, such as behavioral information, demographic information, etc., to a BT company. Therefore, a publisher that is a BT company may also be its own profile supplier. Furthermore, although the name "BT company" implies the targeting of ads is based on collected behavioral profiles, a BT company may also collect other kinds of profile information, such as demographic information or user-provided information, and target ads to those visitors wherever found based on the collected profile information.

Another kind of a BT company is a company that has software installed on a person's computer, such as toolbar software, desktop search software, weather software, or any kind of software that is used by the computer's user. Such software also monitors the computer user's visits to different publishers' sites and media properties and collects profile information about the computer user for the purpose of delivering ads to the user within ad space of sites and media properties that the user visits based on the collected profiles.

A BT company using software installed on a user's computer does not need the cooperation of a visited media property to collect information about the visitor's visit because that software monitors whatever the user is doing on his or her computer. A BT company that has software installed on a user's computer is therefore its own profile supplier. Such software can place a cookie or another kind of tag on the user's computer. Because the software is installed on the user's computer, it can write cookies readable by any domain. That means that the BT company can place a tag or cookie of a second media property, if the BT company would like the second media property to recognize the visitor when the visitor visits that second media property site, by simply having the software place a cookie operating under the domain of the second property on the visitor's computer. The software may also report the collected profiles to a central server of the BT company.

The central server may also tag the visitor or arrange for the visitor to be tagged by operators of other media properties. A BT company can place a cookie on a site's section when a visitor's computer visits that section, if a code of the company was integrated into the page of that section by the site that owns the page. The code (e.g., HTML or Java) redirects to the BT company's server all visitors to the page. Also, in the case that the BT company is the publisher itself, the publisher will simply "cookie" (by itself) all visitors that either read a specific content, search, click, ask for information, make a phone call, etc.

The BT company's server, which either gave the site a unique code for a page, received from the page its URL, or received access to the page's content that could be analyzed by the BT company's server, etc., identifies the content read by the page's visitor, the keyword searched for by the user, an ad clicked on the page, a content item clicked on the page, a phone call that was made that was initiated from the page, information that was requested, or a product was acquired, etc. The content read by the page visitor could be identified by the BT company's server whether the content was reported by the site or whether the content was identified following the analysis of the page. The server then places a cookie on the user's computer indicating what content was read by the visitor on the page, what keyword was searched for by the user, or what ad was clicked on the page, etc. The placed cookie indicates that information (1) in the cookie per se, (2) in a central database operated by the server where the cookie ID is used as a record finder, or (3) both in the cookie and in the database.

Although the above description relates to cookies, a cookie is only one example of a possible tag. A tag generally is a unique identifier used to mark a person electronically visiting a media property, such as a web site, TV channel, radio show, or the like, using a computer, a mobile device, a TV set, a TV set top box, or any other device.

The tag is used for the purpose of delivering additional ads to a visitor to one media property when that visitor is found later on other media properties, based on the visitor's profile collected on the first media property. The profile could be the observed behavior of the visitor on the media property, demographic information collected on the media property, profile information provided by the visitor to the media property, etc. The profile could be made available to the other media properties.

Because the purpose of the tag is to enable the delivery of additional ads on other media properties visited by the visitor, and because the delivery of an ad requires only control of the ad space and not necessarily control of the entire media property visited by the visitor, a media property (in the present context) can also be defined as any equipment that controls an ad space viewed by a visitor, including a web site, an ad network's site (where the ad network represents the ad space of different sites), a TV program, some of the ad space within TV programs or TV channels (represented by a cable company), a TV network, or any ad space for which an entity is allowed to sell an advertisement and deliver it within the ad space; whether the ad space is owned by that entity, or whether the entity pays the owner of the ad space when using its ad space to deliver an ad sold by the entity. Ad space can be on a web site, in a TV program, in a text message, in a radio show, in any broadcasted material, in any streaming video or audio, etc. An ad space can be a fixed position on a page, or the ad space can be made available by a web site to an ad network (for example) only when the web site did not sell all of the site's ad inventory and therefore wishes to make some of the inventory available to the ad network.

In the case of a media property controlling an ad space viewed by a visitor, a specific ad space on a page might be controlled only temporarily. For example, in the case of the web site that did not sell all the ad impressions available to be delivered within an ad space on a page and therefore makes the unsold ad space available to the ad network to fill, the ad network will have temporary control of the ad space, i.e., when that ad space is given to it by the web site. Once the site redirects the ad space on the page to the ad network (so the ad network could fill the ad space with an ad sold by the ad network), the ad network controls the ad space and has access to the visitor viewing the ad space that was redirected to the ad network by the site, and therefore the ad network's equipment is considered a media property, as it controls an ad space viewed by a visitor.

The tag can be placed on the device used by the user to access the first media property where the user's profile was collected (in case of observed behavior, that behavior can be reading a specific content, searching, clicking an ad or content, making a phone call, asking for product information, acquiring a product, or taking any other kind of action). A tag placed on the device (1) could be read only by a server operating under the same domain as the server that placed the tag on the device to begin with as in the case of a cookie for example, (2) could be placed on the device when the user visited the first media property, and then the tag can be read by any second media property visited by the visitor, or (3) could be encrypted and, while accessed by any second media property visited by the visitor, the tag could be deciphered only by second media property computers that received the deciphering code from the first media property. In case of a tag placed by software installed on a user's computer, the tag could be whatever the software wants it to be, including a cookie of any domain.

A tag does not have to be placed on the user's device. A tag can also be used in a central database of a BT company or a central database of any second media property visited by the visitor, where the tag could be a unique identifier either of the device or of the user. In the case where the tag identifies the device, the tag might denote an IP address, a phone number, a device's manufacturer serial number, etc. A cookie placed on the device can also uniquely identify the device and the cookie therefore can be used as a tag in a central database. In the case where the tag identifies the user, the tag might denote the username and password used to access a media property, a user's name and address, a user's e-mail, a user's social security number, or any other personal identifiable information.

As already mentioned, the observed behavior of a visitor to a first media property is referred to as profile information about a specific visitor. A visitor's profile might be enhanced by the visitors' observed behavior on other media properties or by other profile information collected on other media properties.

A visitor's profile can be represented by a unique tag, or the profile can be stored with the tag, whether the tag is placed on the device, on a central database, or both. For example, the profile can be stored within a cookie (tag) on a visitor's device, or the profile can be stored in a central database where the tag connected to the profile is used as a unique identifier of the visitor's device or of the visitor personally. The profile can also be saved on both the device and a central database.

Some 50% to 80% of the ad space on the Internet is considered difficult to monetize, as it is located next to content that tends to be more generalized, such as general news, web based e-mails, instant messages, music or files downloading sites, and software. Advertisers are not willing to pay a high price for delivering an ad to visitors of such sites, as they do not know how many of those sites' visitors are potential clients for their products and services. By contrast, advertisers prefer the placement of ads on dedicated content sites, such as a travel site. For example, an airline is willing to pay a high price per ad on a travel site, as it knows that the ad will be delivered to people who are currently searching for flying tickets. The same is true for TV, where a significant proportion of the ad space is within TV programs where the audience is heterogeneous. It is also true for radio shows and other kind of media.

Using profiles for the delivery of targeted ads within the above-described low-value ad space can turn the low-value ad space into high-value ad space by delivering ads to users that are based on previously collected profiles of the users, rather than ads that are related to the content on the page they are viewing. For example, a "car insurance" related ad, delivered to a person who yesterday searched for "car insurance" within the ad space of a general news page the person is currently reading, will be much more relevant to the person than an ad related to the general news he or she is reading.

The BT companies are described above as collecting profiles and later delivering ads to the profiled visitors when found on other sites. The ads delivered by the BT company to the profiled visitors are either sold by the BT company, which pays royalties to the profile suppliers that provided it with profiles whenever ads presented to their audience generate revenues, or paid for by a publisher that is interested in delivering ads to its own audience outside its site and is paying the BT company to find its audience on other sites. As described, the publisher might be the BT company itself.

In addition, where the collected profiles are mainly used to deliver targeted ads within low-value ad space that is acquired from low-value ad space owners, and the ads are delivered by the BT company, there is also the opportunity to make the collected profiles available to low-value ad space owners, because, instead of selling their low-value ad space to the profile owners, such ad space owners would prefer to monetize their low-value ad space better by themselves, by using the collected profiles to sell targeted ads, delivered to the profiled visitors when found within such low-value ad space.

A low-value ad space owner could be any media property owner, whether it owns a web site, a TV program, a radio show, or any other media property. Also, "low-value" ad space is a relative term. Because ad space prices are usually a function of the content next to the ad space, if a profile-based ad garners a higher price for the ad space owner than an ad based on the adjacent content, then the ad space value is considered "low value" (i.e., in relative terms, relative to the price the ad space will garner if used for delivery of a profile-based ad).

As described, for example, in commonly owned U.S. Pat. No. 6,925,440, (A) profile owners (i.e., who either own the profiles or have the right to resell the profiles on behalf of another profile owner) can provide a databank with access to visitors and their profiles, and (B) either (i) the databank enhances its existing profile on a visitor with a profile owner's profile information about the visitor or (ii) a profile owner enhances the profile it has on a visitor with the databank's profile information about the visitor, where the profile information is given in return for royalties paid for every later usage of the profile information for the delivery of targeted ads to the visitor based on the profile (for example).

Although the invention of the '440 patent provides a media property with additional information about its visitors, several possible challenges arise:

1. If a media property (if acting as a profile owner) wants to enhance the profiles available to it about its visitors and thus contacts a databank and provides it with access to the profiles, the media property might be wasting resources: First, the databank might have no profiles about the media property's visitors. For example, if the databank has no profile about a visitor, the media property would have provided the databank access to the visitor merely to learn that fact. Second, the profiles that the databank does have might be of no use to the media property because its sales force does not sell ads in the category in which the profiles belong. For example, if the databank has a profile about the visitor and it is a health-related profile, but the media property's sales force does not sell ads in the health category, the profile available from the databank about that visitor is of no use to the media property.

2. The media property (if acting as a databank) may be given access by a profile owner to many visitors to that profile owner's site for whose profiles the media property has no need, because the media property has no way of monetizing profiles of those kinds. For example, if a media property's sales force specializes in selling ads in the travel and financial services categories, there is no use in providing them with health, auto, and shopping-related profiles. In cases where a large profile owner makes profiles available to a media property, unless the media property has a very large sales force that specializes in selling ads in many different advertising categories, there is a significant probability that the media property will have no use for most of the profiles received.

3. A media property that receives profiles under the system of the '440 patent described here is committing itself to pay for every usage of a received profile. Because many of the ads (or, depending on the way the profile is transferred, all of the ads) are delivered by the media property after receipt of the profile, it is a challenge for the media property to track usage of the profiles. First, it is not clear which of the visitors (for whom the media owner received profiles) actually visited the media property later on their own accord as opposed to visiting via a redirect, for example from a databank or a profile owner to the media property without the visitor asking for such visit or being aware of it. In the case of a redirect from a databank's server or a profile owner's server, a visitor's browser would simply fetch a 1×1 transparent pixel from the media property's server following the redirect. Second, because it is not clear how many of the profiled visitors will appear later within the ad space of the media property, some tracking of the usage of the profiles by the media property must be established. The problem becomes even more complex when the media property receives the profiles from a databank, because the databank itself aggregates profiles from other profile owners and makes those profiles available to media properties, and it is not clear which of the delivered profiled visitors will visit the media property on their own accord (whether for the first time or not). In that circumstance, it is not clear how the databank will know which profile suppliers to compensate for usage of their profiles. The problem is especially complex when the databank has several profile suppliers providing it with profiles in the same category (for example, the databank may have 20 different travel sites, all allowing the databank to tag their visitors as "travel" visitors) and the databank gives to a media property all of the profiles from those profile suppliers within that category.

Although BT companies can collect profiles and deliver ads to the profiled visitors within low-value ad space that they buy from media properties, there remains the need, therefore, to provide collected profiles to media properties that will better monetize their low-value ad space by selling ads based on the profiles and delivering the ads within their ad space to the profiled visitors when those visitors visit the media properties and making a payment for the profiles to the profile owners who provided the profiles.

What is needed generally is a more efficient method of profile-based behavioral targeting advertisement placement services, particularly for improving monetization of electronic advertisement placement.

SUMMARY OF THE INVENTION

Generally, various aspects of the disclosed embodiments relate to systems and methods for providing collected profiles to media properties, for improved monetization of electronic advertisement placement. The methods have particular importance to media properties that have interests in specific profiles or profiles of a specified category or kind.

The disclosure more specifically relates to an automatic system operated by a profile owner company ("PO company") for identifying media properties interested in having a collected profile made available to them. The automatic system makes the identification by recognizing a collected profile as one that a media property has previously requested or one that is within a category that a media property has previously requested. Thereafter, the PO company arranges for the visitor to be tagged with a tag readable by the media property that requested such a profile.

Using information received from the media property, the PO company then records usage of the profile by the media property. When the PO company also acts as a databank, the PO company determines which profile supplier will be credited for the media property's usage of the profile (i.e., the one that provided the databank with the profile that was used) and records the credit.

In one implementation, when a media property uses a profile, the media property transfers the visitor, along with the profile it is using, to the PO company's system, to let the PO company know which kind of profile was used. The media property might transfer the profile along with the visitor only when the media property receives from the PO company more than one kind of profile, because it is unnecessary if the media property receives only one kind of profile.

Because BT companies collect profiles, any BT company (defined above) could act as a PO company and make profiles available to media properties, whether the PO company owns profiles directly or acts as a databank representing other profile owners. Such other profile owners provide the databank with their profiles in return for (i) royalties paid to them whenever the profiles are used, or (ii) a payment. Any profile supplier (defined above) can also be a PO company.

The above summary does not include an exhaustive list of all aspects of the present invention. Indeed, the inventor contemplates that the invention may include all systems and methods that can be practices from all suitable combinations of the various aspects summarized above, as well as those disclosed in the detailed description below and particularly pointed out in the claims. Such combinations have particular advantages not specifically recited in the above summary.

DESCRIPTION OF PREFERRED EXEMPLARY EMBODIMENTS

In disclosed embodiments, collected profiles are made available by accepting information about desired profiles or profile categories from a media property, identifying an electronic visitor as fitting into the profile category, and arranging for that visitor to be tagged. Preferred additional aspects of disclosed embodiments include automatically electronically recording electronic visits by tagged visitors to a media property, determining which profile supplier will be credited for the recorded electronic visit, and crediting that profile supplier.

Figure 1:
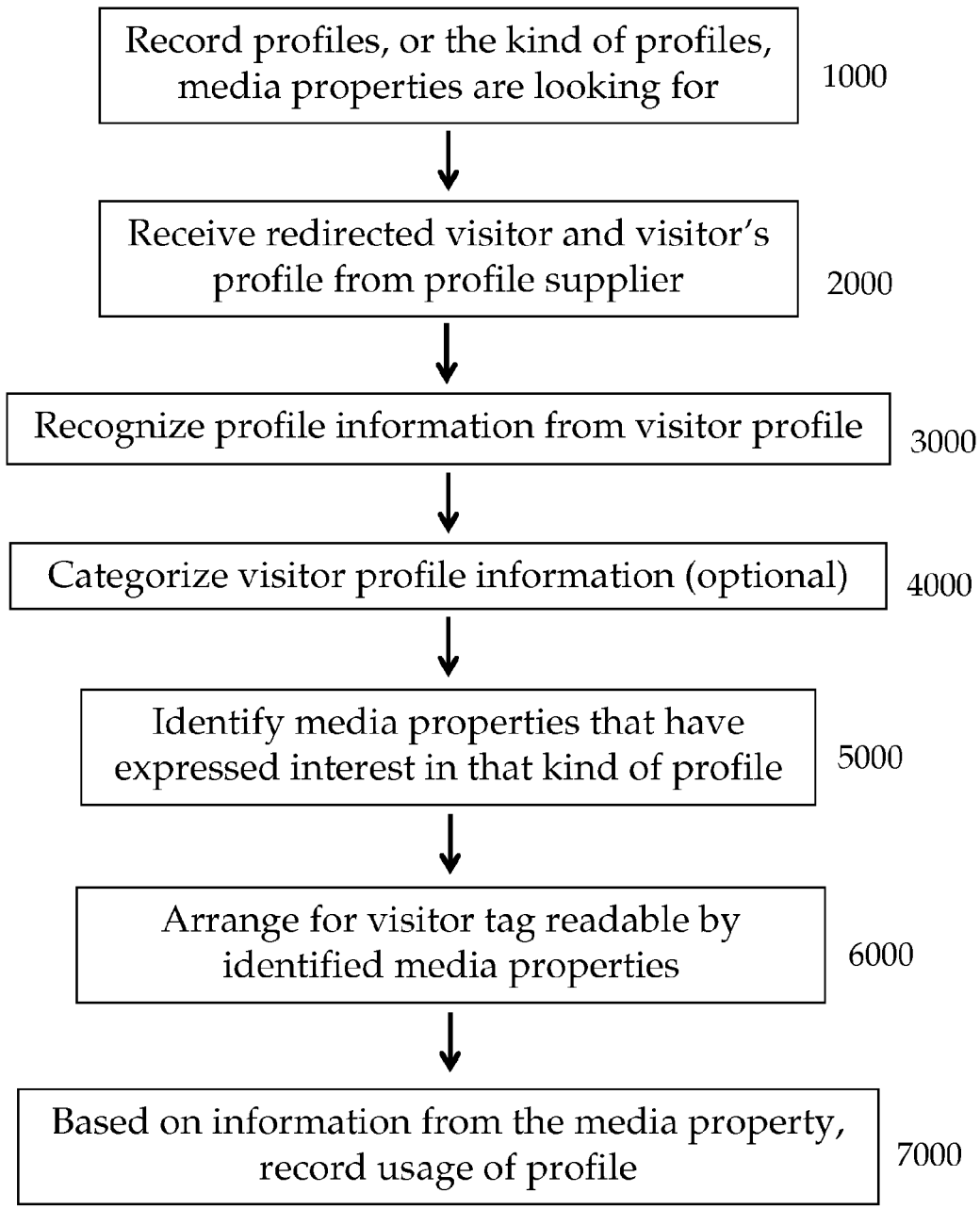
FIG. 1 is a flow diagram of an exemplary embodiment of a method for transferring collected profiles to media properties having specified interests.
Figure 2:
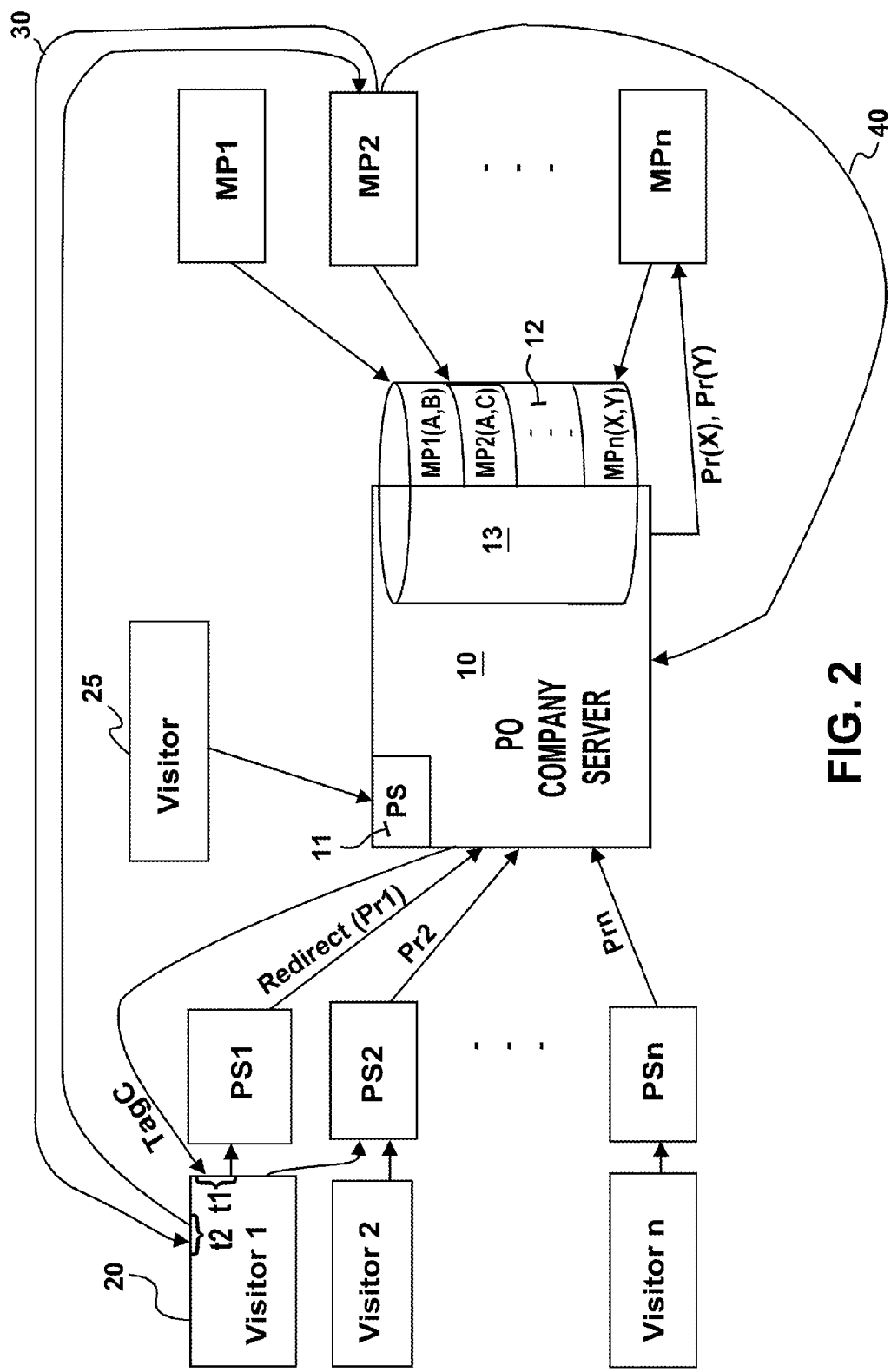
FIG. 2 is a schematic of an exemplary embodiment of entities and associated data flow useful with a method of transferring collected profiles to media properties having specified interests.

The method includes the following basic steps:

1. A PO company's database 12 records (FIG. 1, 1000) the profiles, or the kind of profiles, a media property (e.g., FIG. 2, MP1) is looking for. The profile could be a behavioral profile, a demographic profile, or any other possible profile. For example, a media property (MP1) could ask for visitors who have searched for "car insurance" on a search engine, visitors who were interested in "travel" (MP1(A)), or visitors who were interested in "autos" (MP1(B)), etc. A media property can communicate to the PO company the profiles for which it is looking via e-mail, electronically, via mail, over the phone, or in any other way.

2. A profile supplier (e.g., FIG. 2, PS1) redirects (FIG. 1, 2000) a visitor 20 to a PO company 10 along with the visitor's profile (Pr1). In case the profile supplier is also the PO company (see visitor 25), this step either does not take place or takes place internally, for example via an internal redirect from one server (see 11) to another server 10 operating under the same domain that belongs to the publisher/PO Company. In case the PO company has software on a user's computer that enables it to monitor the user's visits to media properties without the cooperation of the media properties, this step either does not take place or takes place internally, e.g., by the software on the user's computer communicating the collected profile to the PO company's central server.

3. The PO company's server 10 recognizes (3000) the content read by the user, the category to which the content read by the user belongs, the keyword searched for by the user, an ad clicked by the user, or any other action conducted on the page/site by the user (such as click on an item of content or an ad, purchase of a product, request for more information, etc.) during the site visit. The recognizing might be as simple as pulling a keyword for which the visitor searched from a URL used by the profile supplier to redirect the visitor 10 to the PO company, for example. Alternatively, the recognizing might be as simple as recognizing the kind of content read by the visitor by recognizing the URL used by the profile supplier to redirect the visitor to the PO company because the URL is one that the PO company identified to the profile supplier for use when redirecting visitors who read a specific kind of content. Recognizing of content may also be done through a semantic analysis of content of a page read by the visitor.

4. The PO company's server 10 optionally can categorize (4000) specific content read by the user or an action conducted by a user. In some implementations, this step will not take place. An example action might be a search for a keyword. To illustrate, suppose a person searched for an airline ticket to Florida on a travel site. When the PO company receives that information, in addition to recording the search for the flight to Florida in the visitor's profile (whether the profile is stored in the cookie or tag, the PO company's central database 13, or both of those places), the PO company's server 10 may further categorize the person under the "Travel" category and in the "Search for Flights" subcategory of "Travel." In another example, a visitor would be categorized as "searching for an airline ticket" by virtue of having searched for an airline ticket at least three different times within a week, on one media property or several media properties. In that example, if the visitor were to have searched for an airline ticket fewer than three times within a week, the PO company's server 10 will not categorize the visitor as "searching for an airline ticket," because the visitor would be considered as less serious about the purchase according to the definition in use by the PO company.

5. The PO company's server 10 identifies (5000) the media properties (e.g., MP1 and MP2) that have asked to receive a visitor having a profile such as the one recognized in step 3 or categorized in step 4 (e.g., a profile of kind "A" in FIG. 2). Thereafter, the PO company arranges (6000) for the visitor (e.g., 20) to be tagged with a tag readable by the identified media property (e.g., MP1 or MP2), which can use the tag to recognize the visitor's profile.

6. Using information 40 received from the media property, the PO company then records (7000) usage of the profile (e.g., Pr(A)) by the media property (e.g., MP2). When the PO company also acts as a databank, the PO company determines which profile supplier (PS1, PS2, . . . PSn) will be credited for the media property's (e.g., MP2's) usage of the profile and records the credit (e.g., in data store 13).

The PO company's arranging placement of the tag (see step 5 above) can be achieved in different ways:

A. The PO company can redirect (e.g., Pr(X), Pr(Y) in FIG. 2, in cases where media property MPn has expressed interest in those profiles) a visitor to the identified media property with a request to have the identified media property tag the visitor with the media property's own tag, which obviously is readable by the selected media property (such a tag could be a cookie on the visitor's storage device). The tag in this case could be placed by the identified media property following a redirect by the PO company to a specific URL given to the PO company by the media property. The media property would have given the PO company, in this example, different URLs for different kind of profiles, and the PO company would choose the URL for redirecting the visitor to the media property based on the kind of profile recognized.

B. The PO company can itself place a tag (e.g., TagC denoting profile "C" in FIG. 2) that will be readable by the identified media property.

C. The PO company can place an encoded tag that, although accessible by any media property, can be read only by a selected media property to which the PO company gave a deciphering code.

D. In cases when the PO company has software installed on a user's computer, the BT company can arrange for the software to place a tag readable by the identified media property (such a tag could be a cookie operating under the selected media property domain).

E. The PO company can arrange for the identified media property to place a tag in the identified media property's central database, in which case the tag can uniquely identify (1) the device that the visitor will use to access the identified media (IP address, set-top box ID, mobile phone number, manufacturer serial number, cookie readable by the identified media property, etc.), or (2) the user as a person (personal identifiable information).

The identified media property can use its tag to recognize the profile of the visitor either (1) by virtue of each profile having a unique tag (e.g., TagC denoting profile "C" in FIG. 2), or (2) by virtue of the profile that was received from the PO company having been stored (a) with the tag, (b) in the tag (which can occur with a cookie), (c) in a central database (where the tag is used as the link between the visitor and profile), or (d) in all of those places.

In another possible implementation (not shown), aside from the PO company arranging placement of the tag readable by the identified media property, the PO company sends the profile and a copy of the tag separately to the identified media property, which will store the tag and the profile in its central database, and when the identified media property recognizes the tag on a visitor's computer, for example, it pulls the visitor's profile from its database.

The PO company can make a profile available to a media property using the same methods that profile suppliers use to give their profiles to PO companies.

When an identified media property (e.g., MP2 in FIG. 2) recognizes (at time t2) a tagged visitor (tagged previously, at time t1) within its ad space, the media property will serve an ad 30 to the visitor (e.g., visitor 20) based on the profile provided by the PO company 10. Usually, a profile-based ad will be delivered by the media property when it will generate a higher price for the ad space than other ads available to the media property for placement within the ad space.

The media properties (a profile supplier and an identified media property) can be of the same kind of media (e.g., two web sites on the Internet) or of different media (e.g., first media property, where the profile is collected, can be a web site on the Internet, and the second media property, to which the profile is given by the PO company, can be a TV channel on TV or a text message system on a mobile phone, etc.). In the case where the second media property operates within a different media than the first media property, the tagging of the visitor with a tag readable by the second media property (which is arranged by the PO company) might include finding the device used by the visitor to access the second media property (the identified media property) by using personal identifiable information about the visitor. As there may be no connection between the device used by the visitor to access the first media property (computer, for example) and the device used by the visitor to access the second (identified) media property (TV, for example) besides the commonality of the user (visitor), personally identifiable information about the visitor could be used to allow the second media property to learn which device the visitor uses to access the second media property and tag the visitor. The second media property could tag the device used by the visitor to access the second media property by placing a tag on the device itself or in a central database of the second media property, for example.

The process of the PO company enabling an identified media property to place a cookie on a visitor's computer for the purpose of finding the visitor later within the ad space of the identified media property is similar to the way Double-Click's Boomerang system places cookies on visitors to an advertiser site for the purpose of finding those visitors later on other sites where Doubleclick serves ads. That process—where identified media properties place cookies on visitors' computers redirected to them by PO companies—is sometimes referred to as "cookie matching."

For example, following a redirect (not shown) from a server 10 of a PO company #1, weather.com might place a weather.com cookie on a visitor's computer 20 marking the visitor as interested in "travel" (profile category "A") and indicating that the profile originated with PO company #1. Later, if and when the weather.com ad server (MP2) recognizes that the same visitor 20 had happened to visit weather.com's site (weather.com can recognize the visitor by reading its own weather.com cookie), the weather.com ad server (MP2) can choose to deliver a travel-related ad 30 to the visitor 20 within the weather.com ad space. The weather.com ad server's decision whether or not to deliver the travel-related ad will usually depend on the price the ad is expected to bring when compared with the price for other ads available for weather.com to display within the same weather.com ad space.

In step 6, the information received by the PO company might be received from the media property electronically 40, via e-mail, in a file on a CD sent by mail, or in any other form.

That said, because the goal is to make profiles available to media properties on a large scale, it would be beneficial to demand the least complex approach from media properties. After all, the more complex the tracking system that the media properties must implement to track their usage of profiles, the more difficult it will be for them to use profiles that they do not own.

One implementation—where the media property is required to give only minimal effort to track its usage of profiles—is merely asking a media property to provide the PO company server 10, every time that the media property (MP2) serves an ad based on a profile from the PO company, with access to the visitor 20 viewing an ad 30 based on the PO company's profile (e.g., in TagC). Such access, in that implementation, could be achieved by simply having the media property integrate into every profile-based ad it delivers a 1×1 pixel that will redirect (also denoted by 40 in FIG. 2) the visitor 20, when viewing the ad 30 (at time t2), to the PO company server 10. Such a 1×1 pixel can point to a URL given to the media property by the PO company that is unique to a certain kind or category of profiles (so the PO company could recognize not only the fact that the media property used a profile but also the kind of profile used). The advantage of this implementation is that the PO company is the one that records the profile usage, and the media property does not have to do anything further to keep or transfer records.

In the same implementation, in cases where the PO company has transferred more than one kind of profiles to a media property (for example, profiles "A" indicating interest in travel and profiles "B" indicating interest in autos), the media property can send the PO company, along with the access to the visitor viewing an ad, an indication of which profile the media property used to deliver the ad currently being viewed by the visitor. In that implementation, a travel profile will be indicated by the media property's use of a first URL to redirect the visitor to the PO company server, an auto profile will be indicated by the media property's use of a second URL to redirect the visitor to the PO company server, etc. (The different URLs for different kind of profiles would be ones given to the media property by the PO company.)

Because different kind of profiles might have different rates (a travel profile might fetch $2 CPM, auto profiles might fetch $5 CPM, etc.), it is important to know which of the profiles the media property used. Also, if the PO company is acting as a databank, it might have different ways in which it compensates profile suppliers for their collected profiles.

Based on its profile collection and compensation policy, the PO company can decide which profile suppliers to credit for the delivery of a profile-based ad by a media property. For example, the PO company might decide that, for behavioral profiles, time is important, so only the last profile supplier to report a behavioral profile of a visitor (before an ad based on that profile is served to the visitor) will be compensated but any other profile suppliers that provided the same kind of profile information about the same visitor earlier will not be compensated.

The following example illustrates the above-described embodiment. Suppose a visitor 20 searches for airline tickets on three different sites (PS1, PS2, and PSn), and all three sites delivered the visitor 20 to the PO company server 10 along with the information that the visitor searched for an airline ticket. Suppose further that the PO company has recognized that the Yahoo! site (MP2 is Yahoo! this time) is interested in receiving travel ("A") profiles and therefore has redirected (not shown) the visitor 20 to Yahoo! on three different occasions along with the information that the visitor searched for an airline ticket; that is, each time the PO company server 10 itself received access to the visitor 20 following a redirect from a profile supplier (PS1, PS2, or PSn), it immediately redirected the visitor to Yahoo!, because it recognized the visitor 20 as interested in "travel" (in this example, according to a definition that recognizes a visitor as interested in "travel" after only one search for an airline ticket).

Later (time t2), when the visitor 20 chooses to visit yahoo.com (MP2) on his or her own accord, Yahoo! recognizes the profiled visitor 20 and delivers a travel-related ad 30 to the visitor 20; however, Yahoo! has that opportunity only after Yahoo! has received the profile about the visitor 20 from the PO company three times. If Yahoo! has integrated into the travel ad 30 delivered to the visitor 20 a 1×1 pixel redirecting the visitor 20 to the PO company, the visitor's browser, when fetching the ad from the Yahoo! ad server (MP2), also approaches the PO company server 10. The PO company server 10 learns, from the URL that the visitor's browser is using to access it, that Yahoo! (MP2) has served a travel-related ad 30 to the visitor 20.

Based on that information, the PO company records (in data store 13) a charge of two tenths of a cent to Yahoo! (in this example, $2 CPM, or $2 per 1,000, is the rate the PO company charges for travel-related ("A") ads delivered based on travel profiles provided by the PO company to a media property).

The PO company stores, as part of the visitor's profile, data indicating which profile suppliers provided profiles about the visitor and the date and time the profiles were supplied. The PO company stores the profile (1) in the tag (a cookie, for example), (2) along the tag, (3) in a central database (e.g., 13), in which case the tag is used as a link between the visitor's computer and the profile information in the database, or (4) in all of those places.

Note that the PO company's tag is different from the identified media property's tag. The PO company's tag is used to uniquely identify a visitor about which the PO company has a profile, where the profile itself includes the profile suppliers that provided the profile, the dates and times they have done so, and possibly other information, all part of the visitor's profile definition. The identified media property's tag is used by the media property to recognize the profile of the visitor.

The PO company uses its own tag to access the visitor profile and learn which profile supplier (PS1, PS2, or PSn) was the last one to supply the travel-related ("A") profile (the visitor's search for airline tickets), which Yahoo! (MP2) used to deliver the ad. The PO company then records (also, e.g., in 13) a credit of one tenth of a cent (half of the charge to Yahoo!) to that profile supplier. In this example, a revenue share of 50%-50% between the profile supplier and the PO company is used. If the PO company had agreed with the profile supplier on a 40% revenue share, the profile supplier would have been given a credit of eight hundredths of a cent ($2/1000*40%), or if the profile supplier was promised $0.001 for every use of its profile, the PO company would have recorded a credit of $0.001 to the profile supplier.

In a second illustration, the PO company might decide that a visitor should be considered interested in "travel" only if the visitor searches for airline tickets three different times within a week, on the same site or different sites. In that case, only when the visitor is recognized as interested in "travel" according to that definition will the PO company make the visitor's "travel" profile available to media properties (MP2) interested in "travel" ("A") profiles. In this example, if a first profile supplier PS1 delivers the visitor 20 and the information (Pr1) that the visitor 20 is searching for airline tickets on Sunday, a second profile supplier PS2 delivers the visitor 20 to the PO company 10 on Monday along with the information (Pr2) that the visitor 20 is searching for airline tickets, and the first profile supplier PS1 again delivers the visitor 20 to the PO company 10 on Wednesday along with the information (not shown) that the visitor 20 is searching for airline tickets, then only at that time on Wednesday will the PO company's server 10 recognize the visitor 20 as a "travel" ("A") visitor and redirect (not shown) the visitor's computer 20 to Yahoo! (MP2).

In that second illustration, when Yahoo! (MP2) serves a travel-related ad 30 to the visitor 20 and redirects (40) the visitor 20 to the PO company 10, the PO company might credit (in 13) the first profile supplier PS1 with two thirtieths of a cent ($2/1000*50%*⅔) and the second profile supplier PS2 with one thirtieth of a cent ($2/1000*50%*⅓). In other words, in that illustration, (a) Yahoo! agreed to pay $2 for every thousand travel-related ads delivered based on profiles provided by the PO company, (b) the PO company promised to give profile suppliers half of the revenues the PO company generates from ads delivered by media properties based on the profiles it makes available to them, and (c) the visitor was recognized as interested in "travel" thanks to two visits (out of the three visits to travel sites that defined the visitor as interested in "travel") made to the first profile supplier's site and one visit to the second profile supplier's site. Therefore, the first profile supplier is entitled to two thirds of the amount due to the profile suppliers altogether, and the one visit made by the visitor to the second profile supplier's site entitles the second profile supplier to one third of the amount due to the profile suppliers altogether.

Alternatively, the PO company—when making a profile available to a media property by arranging for placement of a tag readable by the identified media property—can add a unique ID to the profile (or to the tag in cases where the tag is used by the media property to recognize the visitor's profile) and ask the media property to report the ID back to the PO company whenever the media property uses the transferred profile. The PO company can use the unique ID to record in its database the profile suppliers that will be entitled to a credit when the media property delivers ads based on the transferred profile. The media property could report 40 to the PO company (at the end of the month, for example) the number of ads it has served, for each unique ID. Because each unique ID represents a kind of profile, the PO company will know what rate it should charge the media property for usage of the profile, and because the unique ID also tells the PO company which profile suppliers should be entitled to a credit for the usage of a profile, the PO company can also credit the deserving profile suppliers.

The media property might pay the PO company for every ad impression delivered based on the received profile or only when an action takes place that is connected to the ad (perhaps occurring on the advertiser's site immediately following a click on the ad or perhaps occurring a few days after viewing the ad or clicking the ad), such as a click on the ad, a registration on the advertiser's site, a request for information, a product acquisition, or the making of a phone call.

Different implementations might be chosen depending on the relative sizes of a profile owner (in terms of number of profiled visitors; note that the profile owner may also be a databank) and a media property (in terms of number of visitors). In cases where the media property has many visitors and is considered to have an extensive reach ("reach" is a figure used to express the percentage of the population using a media that visits the media property; for example, Valueclick, a web-based ad network of sites reaches 80% of the US web population), a profile owner might transfer to the media property all visitors within the categories requested by the media property, because the probability of finding a profiled visitor within the media property's ad space is high (in the case of Valueclick, the probability is 80%).

In cases where the media property's reach is not very significant, but the profile owner has a relatively large number of profiles, the media property may choose to make its visitors accessible to the profile owner to check whether the profile owner can enhance the profiles of some of its visitors, in the ad categories of interest to the media property, instead of having the profile owner send all of its visitors in the categories of interest, because, as a result of the media property's low reach, only a small percentage of visitors sent to the media property by the profile owner will later choose to visit the low-reach media property.

Public Notice Regarding the Scope of the Invention and Claims

The inventor considers various elements of the aspects and methods recited in the claims filed with the application as advantageous, perhaps even critical to certain implementations of the invention. However, the inventor regards no particular element as being "essential," except as set forth expressly in any particular claim.

Although the invention has been described in terms of preferred embodiments and generally associated methods, the inventor contemplates that alterations and permutations of the preferred embodiments and methods will become apparent to those skilled in the art upon a reading of the specification and a study of the drawings.

I claim :

1. A method of causing delivery of electronic advertisements based on provided profiles comprising:
   (a) with a computer system automatically tagging a device of a visitor following receipt from a profile owner computer of indicia of a profile associated with the visitor, for profiles matching a profile or kind of profiles desired by an entity controlling the computer system;
   (b) wherein the profile owner computer is programmed:
      (i) to automatically select an electronic-advertising-space-controlling entity based on a comparison of (A) profile information about a visitor who electronically accessed electronic apparatus of a profile supplier with (B) a plurality of stored requests from different entities, each stored request being for requested profiles or kinds of profiles, which plurality of stored requests includes the desired profile or kind of profiles, and
      (ii) to automatically arrange for electronic storage of a tag that is associated with the visitor and that is readable by an electronic-advertising-space-controlling equipment controlled by the selected entity, which equipment is part of the computer system of part (a) when the selected entity is the entity controlling the computer system; and
   (c) later, with the computer system, automatically checking electronic devices of a multitude of visitors accessing the computer system for the tag readable by the computer system and, when found, automatically causing delivery of a profile-dependent electronic advertisement to the tagged visitor devices.

2. The method of claim 1 wherein the device in part (a) is a computer of the visitor that has accessed the computer system as a result of URL redirection from the profile owner computer, and wherein the profile owner computer is programmed to automatically arrange for electronic storage of the tag by automatically placing the computer of the visitor in communication with the equipment via redirection to a URL specified by the selected entity.

3. The method of claim 1 further comprising, after parts (a) and (c), with the computer system electronically reporting information about delivery of the advertisement to the tagged visitor devices, which report is provided to the profile owner company.

4. The method of claim 3 wherein electronically reporting comprises automatically placing the tagged visitor devices that are computers in communication with computer equipment controlled by the profile owner, via URL redirection from the computer system when the computer system utilizes the profile to cause delivery of the advertisement.

5. The method of claim 4 wherein URL redirection comprises delivering an advertisement containing a redirection instruction.

6. The method of claim 3 wherein reporting further comprises automatically electronically identifying to the profile owner company one of a plurality of profiles or kind of profiles used in association with delivery of the advertisement.

7. The method of claim 6 wherein electronically reporting comprises automatically placing the tagged visitor devices that are computers in communication with computer equipment controlled by the profile owner, via URL redirection from the computer system when the computer system utilizes the profile to cause delivery of the advertisement, and identifying comprises placing the tagged visitor computers in communication with one of a plurality of URLs depending on which of the plurality of profiles or kinds of profiles was used in association with delivery of the advertisement.

8. The method of claim 1 further comprising, after parts (a) and (c), with the computer system automatically creating electronic data used to identify a payment amount due to the profile owner company as a result of delivery of the profile-dependent electronic advertisement to the tagged visitor devices.

9. The method of claim 1 wherein the act of automatically causing delivery of a profile-dependent electronic advertisement in part (c) is performed only when a price for delivery of the profile-dependent electronic advertisement to the tagged visitor devices is higher than a price for delivery to the tagged visitor devices of a first advertisement based on content adjacent to the advertising space into which the first advertisement is delivered.

10. The method of claim 9 further comprising:
 (i) wherein the device in part (a) is a computer of the visitor that has accessed the computer system as a result of URL redirection from the profile owner computer, and wherein the profile owner computer is programmed to automatically arrange for electronic storage of the tag by automatically placing the computer of the visitor in communication with the equipment via redirection to a URL specified by the selected entity;
 (ii) after parts (a) and (c), with the computer system electronically reporting information about delivery of the advertisement to the tagged visitor computers, which information includes identifying to the profile owner company one of a plurality of profiles or kind of profiles used in association with delivery of the advertisement; and
 (iii) after parts (a) and (c), with the computer system automatically creating electronic data used to identify a payment amount due to the profile owner company as a result of delivery of the profile-dependent electronic advertisement to the tagged visitor devices.

11. A computer system comprising one or more computers, wherein the one or more computers are programmed and connected:
 (a) to automatically tag a device of a visitor following receipt from a profile owner computer of indicia of a profile associated with the visitor, for profiles matching a profile or kind of profiles desired by an entity controlling the computer system;
 (b) wherein the profile owner computer is programmed:
  (i) to automatically select an electronic-advertising-space-controlling entity based on a comparison of (A) profile information about a visitor who electronically accessed electronic apparatus of a profile supplier with (B) a plurality of stored requests from different entities, each stored request being for requested profiles or kinds of profiles, which plurality of stored requests includes the desired profile or kind of profiles, and
  (ii) to automatically arrange for electronic storage of a tag that is associated with the visitor and that is readable by an electronic-advertising-space-controlling equipment controlled by the selected entity, which equipment is part of the computer system when the selected entity is the entity controlling the computer system; and
 (c) later, to automatically check electronic devices of a multitude of visitors accessing the computer system for the tag readable by the computer system and, when found, to automatically cause delivery of a profile-dependent electronic advertisement to the tagged visitor devices.

12. The computer system of claim 11 wherein the device in part (a) is a computer of the visitor that has accessed the computer system as a result of URL redirection from the profile owner computer, and wherein the profile owner computer is programmed to automatically arrange for electronic storage of the tag by automatically placing the computer of the visitor in communication with the equipment via redirection to a URL specified by the selected entity.

13. The computer system of claim 11 wherein the one or more computers are further programmed to, after parts (a) and (c), electronically report information about delivery of the advertisement to the tagged visitor devices, which report is provided to the profile owner company.

14. The computer system of claim 13 wherein the one or more computers are programmed to electronically report by automatically placing the tagged visitor devices that are computers in communication with computer equipment controlled by the profile owner, via URL redirection from the computer system when the computer system utilizes the profile to cause delivery of the advertisement.

15. The computer system of claim 13 wherein the one or more computers are programmed to electronically report by further automatically electronically identifying to the profile owner company one of a plurality of profiles or kind of profiles used in association with delivery of the advertisement.

16. The computer system of claim 11 wherein the one or more computers are further programmed to, after parts (a) and (c), automatically create electronic data used to identify a payment amount due to the profile owner company as a result of delivery of the profile-dependent electronic advertisement to the tagged visitor devices.

17. The computer system of claim 16:
 (i) wherein the one or more computers are programmed to automatically cause delivery of a profile-dependent electronic advertisement in part (c) only when a price for delivery of the profile-dependent electronic advertisement to the tagged visitor devices is higher than a price for delivery to the tagged visitor devices of a first advertisement based on content adjacent to the advertising space into which the first advertisement is delivered;

(ii) wherein the device in part (a) is a computer of the visitor that has accessed the computer system as a result of URL redirection from the profile owner computer, and wherein the profile owner computer is programmed to automatically arrange for electronic storage of the tag by automatically placing the computer of the visitor in communication with the equipment via redirection to a URL specified by the selected entity; and (ii) wherein the one or more computers are further programmed to, after parts (a) and (c), electronically report information about delivery of the advertisement to the tagged visitor computers, which information includes identifying to the profile owner company one of a plurality of profiles or kind of profiles used in association with delivery of the advertisement.

18. An article comprising a non-transitory tangible medium encoding computer-readable instructions that, when applied to a computer system comprising one or more computers, instruct the one or more computers to perform a method comprising:

(a) automatically tagging a device of a visitor following receipt from a profile owner computer of indicia of a profile associated with the visitor, for profiles matching a profile or kind of profiles desired by an entity controlling the computer system;

(b) wherein the profile owner computer is programmed:

(i) to automatically select an electronic-advertising-space-controlling entity based on a comparison of (A) profile information about a visitor who electronically accessed electronic apparatus of a profile supplier with (B) a plurality of stored requests from different entities, each stored request being for requested profiles or kinds of profiles, which plurality of stored requests includes the desired profile or kind of profiles, and (ii) to automatically arrange for electronic storage of a tag that is associated with the visitor and that is readable by an electronic-advertising-space-controlling equipment controlled by the selected entity, which equipment is part of the computer system of part (a) when the selected entity is the entity controlling the computer system; and (c) later automatically checking electronic devices of a multitude of visitors accessing the computer system for the tag readable by the computer system and, when found, automatically causing delivery of a profile-dependent electronic advertisement to the tagged visitor devices.

19. The article of claim 18 wherein the device in part (a) is a computer of the visitor that has accessed the computer system as a result of URL redirection from the profile owner computer, and wherein the profile owner computer is programmed to automatically arrange for electronic storage of the tag by automatically placing the computer of the visitor in communication with the equipment via redirection to a URL specified by the selected entity.

20. The article of claim 18 wherein the computer-readable instructions instruct the one or more computers to perform a method further comprising, after parts (a) and (c), electronically reporting information about delivery of the advertisement to the tagged visitor devices, which report is provided to the profile owner company.

21. The article of claim 20 wherein electronically reporting comprises automatically placing the tagged visitor devices that are computers in communication with computer equipment controlled by the profile owner, via URL redirection from the computer system when the computer system utilizes the profile to cause delivery of the advertisement.

22. The article of claim 20 wherein reporting further comprises automatically electronically identifying to the profile owner company one of a plurality of profiles or kind of profiles used in association with delivery of the advertisement.

23. The article of claim 18 wherein the computer-readable instructions instruct the one or more computers to perform a method further comprising, after parts (a) and (c), automatically creating electronic data used to identify a payment amount due to the profile owner company as a result of delivery of the profile-dependent electronic advertisement to the tagged visitor devices.

24. The article of claim 23 the computer-readable instructions instruct the one or more computers to perform a method:

(i) wherein the act of automatically causing delivery of a profile-dependent electronic advertisement in part (c) is performed only when a price for delivery of the profile-dependent electronic advertisement to the tagged visitor devices is higher than a price for delivery to the tagged visitor devices of a first advertisement based on content adjacent to the advertising space into which the first advertisement is delivered;

(ii) wherein the device in part (a) is a computer of the visitor that has accessed the computer system as a result of URL redirection from the profile owner computer, and wherein the profile owner computer is programmed to automatically arrange for electronic storage of the tag by automatically placing the computer of the visitor in communication with the equipment via redirection to a URL specified by the selected entity;

(iii) further comprising, after parts (a) and (c), electronically reporting information about delivery of the advertisement to the tagged visitor computers, which information includes identifying to the profile owner company one of a plurality of profiles or kind of profiles used in association with delivery of the advertisement.

* * * * *

UNITED STATES PATENT AND TRADEMARK OFFICE
CERTIFICATE OF CORRECTION

PATENT NO. : 8,244,574 B2
APPLICATION NO. : 13/170110
DATED : August 14, 2012
INVENTOR(S) : Roy Shkedi It is certified that error appears in the above-identified patent and that said Letters Patent is hereby corrected as shown below:

Page 2, column 1, line 12, "683,220" should be --6,832,207--
Page 2, column 1, line 15, "692,544" should be --6,925,440--
Page 2, column 1, line 17, "697,343" should be --6,973,436--
Page 2, column 1, line 21, "704,353" should be --7,043,531--
Page 2, column 1, line 26, "707,285" should be --7,072,853--
Page 2, column 1, line 30, "718,807" should be --7,188,076--

Signed and Sealed this
Thirtieth Day of October, 2012

David J. Kappos
*Director of the United States Patent and Trademark Office*

Disclaimer

8,244,574 B2 - Roy Shked, New York, NY (US). METHOD, COMPUTER SYSTEM AND STORED PROGRAM FOR CAUSING DELIVERY OF ELECTRONIC ADVERTISEMENTS BASED ON PROVIDED PROFILES. Patent dated August 14, 2012. Disclaimer filed September 13, 2017, by the inventor.

I hereby disclaim the following complete claims 8, 16, and 23 of said patent.

*(Official Gazette, September 6, 2022)*